Sept. 20, 1960
A. SCHRAUDER
2,952,915
MASONRY GUIDE
Filed Sept. 29, 1958
2 Sheets-Sheet 1
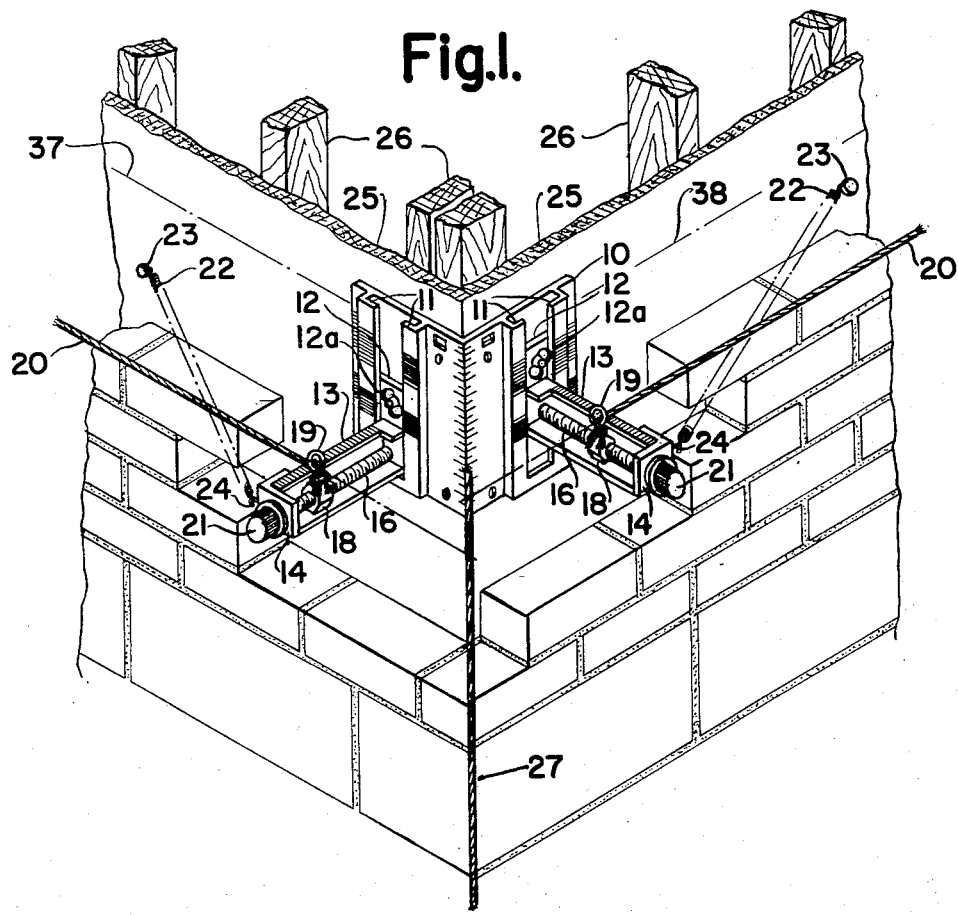
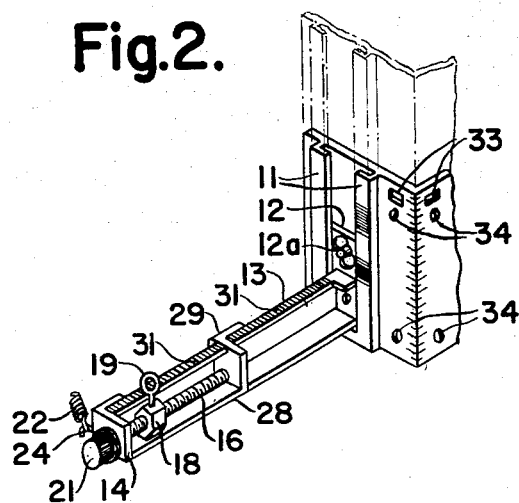
INVENTOR.
Andrew Schrauder
BY Archworth Martin
attorney

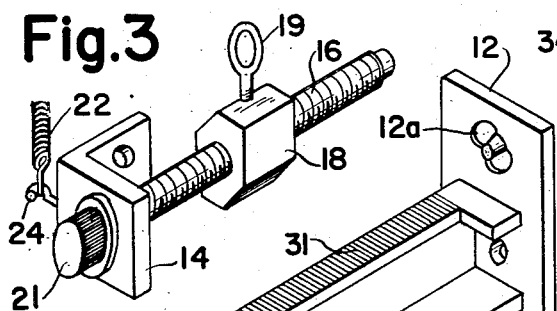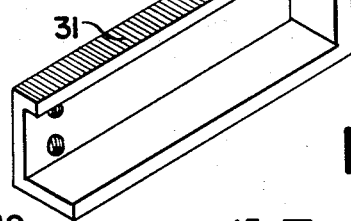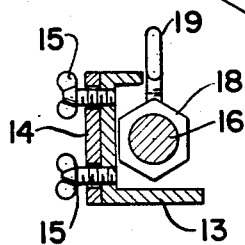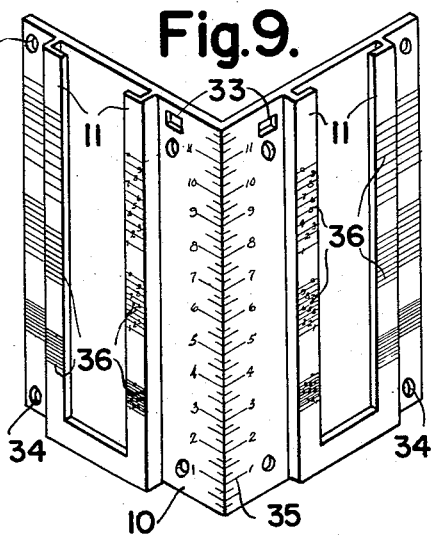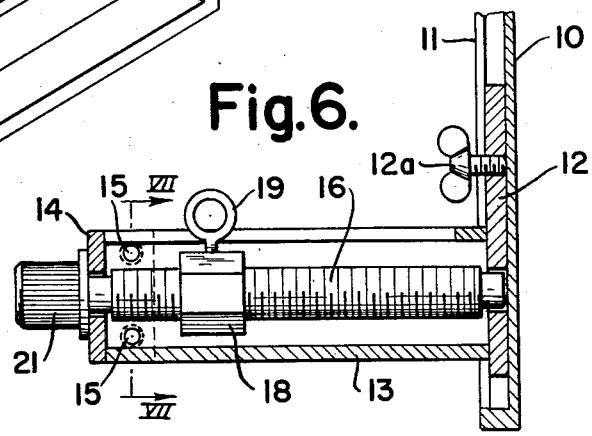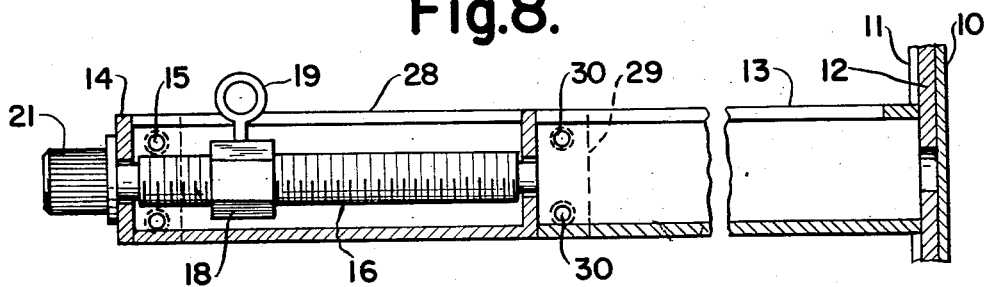

United States Patent Office 2,952,915
Patented Sept. 20, 1960

2,952,915
MASONRY GUIDE

Andrew Schrauder, 1505 Schrauder Road,
Pittsburgh 12, Pa.

Filed Sept. 29, 1958, Ser. No. 764,010

2 Claims. (Cl. 33—85)

My invention relates to masonry guides, and more particularly to guides for adjustably positioning guide lines for the courses of brick, stone or similar building materials.

One object of my invention is to provide means for more conveniently positioning the guide lines vertically for the laying of brick courses, and for adjusting the guide line supports in horizontal directions perpendicularly to sheathing or other building elements for which facing bricks or the like are used.

In the accompanying drawings:

Figure 1 is a perspective view of a building corner, showing the manner in which my adjustable guide line supports are positioned for vertical and horizontal adjustments.

Fig. 2 shows a modification of a portion of the structure of Fig. 1.

Figs. 3, 4 and 5 are enlarged perspective views of certain parts of the structure of Fig. 2.

Fig. 6 is an enlarged sectional view of the line adjusting device of Fig. 1.

Fig. 7 is a view taken on the line VII—VII of Fig. 6.

Fig. 8 is an enlarged sectional elevation view of a portion of the structure of Fig. 2.

Fig. 9 is an enlarged perspective view of the body member of Fig. 1.

Referring first to Figs. 1, 6 and 7, the device comprises a body member 10 of angular shape formed from sheet metal, aluminum, wood, alloy, or a plastic, and suitably 1 ft. high with its flanges perhaps 8 or 10 inches wide. Angles 11 are formed on/or welded to the body member 10 and serve as slideways for a vertically shiftable base 12 which is adjustably positioned at various vertical heights by screws that have winged heads 12a, these screws being threaded in the base 12 and turned so that their inner ends exert a clamping thrust against the body 10, to frictionally hold the base in the guides 11.

A bracket 13 is welded or otherwise secured to the base plate 12 and has removably secured thereto an angular extension 14 that is removably held on the bracket by winged-head attaching screws 15 as shown more clearly in Fig. 7.

An adjusting screw 16 is rotatably supported in the bracket extension 14 at its outer end and at its inner end seats loosely in the base plate 12, as shown more clearly in Fig. 6. A nut 18 has threaded engagement with the screw 16 and carries an eye screw 19 to which is connected a guide line 20 for the brick courses, the nut being adjustable perpendicularly to the face of the building by turning the knurled head 21 of the screw 16.

The remote extremities of the lines 20 shown in Fig. 1 will be connected to any suitable support, as for example, another guide apparatus such as that shown in Fig. 1. The body member 10 is held against the corner of the building structure by tension on the line 20 and by guys 22 that may conveniently be in the form of coil springs so as to have considerable yieldability and sufficient tension to maintain the guide device 10 at various positions of vertical adjustment, without the necessity of resetting the anchoring nails 23 each time the guide bracket is shifted upwardly for another course of bricks. The other ends of the guy members 22 are hooked to eyes 24 on the members 14.

The lines 20 can be adjusted such distance outwardly from the sheathing or wall board 25 and the frame 26 as to leave a desired clear space between the brick wall and the members 25 and 26. It will be seen that it is not necessary to bring the brick courses into direct engagement with any form or guide plate, since the brick courses will be laid with the lines 20 as a guide, the bracket bases 12 being shifted up as the bricklaying progresses.

The incompleted courses of bricks shown in Fig. 1 will be filled in when the guide 10 has been elevated to a higher plane above the uppermost brick course. The vacant area is small and workmen will have no difficulty in properly laying and alining bricks to fill out the corner end, by using the conventional corner plumb line 27.

Where blocks, tile or other building elements of much greater size than ordinary building bricks are to be laid, I provide an extension of the bracket 13, as shown more clearly in Figs. 2 and 8. This extension 28 is of somewhat the same form as the member 13. The member 28 has an angular extension 29 that is welded to the inner end thereof and is detachably secured to the member 13 by set screws 30 similar to the screws 15 of Fig. 7. In this modified arrangement the screw 16 has a reduced inner end that is rotatable in the angle 29 and has threaded engagement with the nut 18 that carries the line guide 19. The notches 31 in the upper edges of the bracket 13 can serve as positioning elements for the lines, if eye 19 becomes lost, the lines in that case being wrapped around the bracket, and held by the notches against slipping.

If guideways of greater length than that provided for by the body member 10 are desired, other body members of duplicate form can be connected thereto by bolts extending through holes shown at 33 in Fig. 2, it being understood that the body members are usually made of thin guage material. Also if there is danger of slipping of the body members on the structural framework or sheathing of a building, nails can be driven into the holes 34 for temporary support.

An important feature of my invention resides in the fact that the inner structural work of the building such as sheathing or framing members serve as supports for the body member 10 and the guide devices carried thereby, without the necessity of using supporting posts or the like temporarily placed at some distance outwardly from the brick work.

A scale or scales 35 of conventional foot rule type is provided at the corner of the body member 10 as shown more clearly in Fig. 9, and conventional mason's scale 36 are employed for normal use in laying successive courses of bricks. The scale 35 will frequently be employed where graduations different than those shown on the mason's scale will be needed, as for example, where definite measurements such as ¼" spacing is desired. Chalk marks or the like such as at 37 and 38 can be applied to the sheathing to indicate window and door openings.

I claim as my invention:

1. Guide apparatus for use in the building of walls of the masonry type, that comprises a body member of angular form whose flanges will respectively fit against side-wall elements at the corner of a building that is to be faced with masonry, and being shiftable vertically along said corner, a bracket extending outwardly and vertically adjustable on each flange of the body, the brackets being of such horizontal length that their outer ends are at least as distant from the body member as the outer face of the masonry that is to be placed through the use of the guide, guide-line supports adjacent to the outer ends of the brackets, and a flexible guy member connected to each bracket at a distance from the body member that is greater than the thickness of the masonry, and being of such length that it can be connected to the adjacent side-wall element above the masonry, in an upwardly sloping direction, to a point spaced laterally from and higher than the bracket, a substantial portion of the guy member being spaced from the wall element a distance greater than the thickness of the masonry.

2. Apparatus as recited in claim 1, wherein the guide-line supports are horizontally adjustable to various positions between the guy members and the said body members.

References Cited in the file of this patent
UNITED STATES PATENTS

| | | |
|---|---|---|
| 783,284 | Kincaid | Feb. 21, 1905 |
| 1,501,814 | Scofield | July 15, 1924 |
| 1,872,860 | Winter | Aug. 23, 1932 |
| 2,076,534 | Galbraith | Apr. 13, 1937 |
| 2,615,253 | Weathers | Oct. 28, 1952 |
| 2,811,778 | Snyder | Nov. 5, 1957 |